US009616452B2

(12) United States Patent
Okubo et al.

(10) Patent No.: US 9,616,452 B2
(45) Date of Patent: Apr. 11, 2017

(54) SHOWER APPARATUS

(71) Applicant: Takayasu Okubo, Hyogo (JP)

(72) Inventors: Takayasu Okubo, Hyogo (JP); Minao Tanioka, Tokyo (JP); Hirohiko Sato, Hyogo (JP)

(73) Assignee: Takayasu Okubo, Hyogo (JP)

( * ) Notice: Subject to any disclaimer, the term of this patent is extended or adjusted under 35 U.S.C. 154(b) by 0 days.

(21) Appl. No.: 14/686,087

(22) Filed: Apr. 14, 2015

(65) Prior Publication Data
US 2015/0266046 A1    Sep. 24, 2015

Related U.S. Application Data

(62) Division of application No. 13/819,847, filed as application No. PCT/JP2012/052246 on Feb. 1, 2012, now abandoned.

(30) Foreign Application Priority Data

Mar. 1, 2011    (JP) ................................. 2011-058506
Oct. 28, 2011   (JP) ................................. 2011-250116

(51) Int. Cl.
B05B 15/08    (2006.01)
B05B 1/18     (2006.01)
(Continued)

(52) U.S. Cl.
CPC ............... B05B 15/08 (2013.01); B05B 1/18 (2013.01); B05B 15/066 (2013.01); E03C 1/06 (2013.01); E03C 1/0409 (2013.01); F16L 27/04 (2013.01)

(58) Field of Classification Search
CPC .................................................. B05B 15/066
(Continued)

(56) References Cited

U.S. PATENT DOCUMENTS 4,035,004 A * 7/1977 Hengesbach ......... B05B 7/2408
                                                      222/372
4,187,033 A * 2/1980 Zukowski ................ B62D 7/18
                                                      280/93.511
(Continued)

FOREIGN PATENT DOCUMENTS

DE    20 2006 001 535    6/2007
JP         63-86861       6/1988
(Continued)

OTHER PUBLICATIONS

Supplementary European Search Report (ESR) issued Dec. 22, 2014 in corresponding European Patent Application No. EP 12 75 2982.

(Continued)

Primary Examiner — Christine Skubinna
(74) Attorney, Agent, or Firm — Wenderoth, Lind & Ponack, L.L.P.

(57) ABSTRACT

A shower apparatus comprises a head, a base end portion, and a multi-spherical bendable joint pipe disposed between the head and the base end portion, the pipe comprising a plurality of spherical joints provided consecutively. Each joint has a male or female spherical surface for rotationally fitting with adjacent joints each other. The spraying direction of shower water is freely changeable by adjusting the direction of the head through a flection of the multi-spherical bendable joint pipe. The shower apparatus allows a jet direction of shower water to be changed widely three-dimensionally compared with a conventional shower apparatus, and thus the present invention provides a user-friendly shower apparatus.

1 Claim, 13 Drawing Sheets

(51) Int. Cl.
    *B05B 15/06*     (2006.01)
    *E03C 1/06*     (2006.01)
    *E03C 1/04*     (2006.01)
    *F16L 27/04*     (2006.01)

(58) Field of Classification Search
    USPC .................................. 4/615; 239/587.1–588
    See application file for complete search history.

(56) References Cited

U.S. PATENT DOCUMENTS

| | | | |
|---|---|---|---|
| 5,149,146 A * | 9/1992 | Simoni | B05B 15/067 |
| | | | 285/146.1 |
| 5,865,378 A | 2/1999 | Hollinshead et al. | |
| 5,871,029 A | 2/1999 | Peteri et al. | |
| 6,164,569 A | 12/2000 | Hollinshead et al. | |
| 6,629,651 B1 | 10/2003 | Male et al. | |
| 7,097,122 B1 * | 8/2006 | Farley | B05B 15/008 |
| | | | 239/553 |
| 2004/0056122 A1 | 3/2004 | Male et al. | |
| 2004/0155460 A1 | 8/2004 | Nobili | |
| 2005/0103903 A1 * | 5/2005 | Shamir | F16L 11/18 |
| | | | 239/587.2 |
| 2006/0231648 A1 * | 10/2006 | Male | B05B 15/066 |
| | | | 239/587.1 |

FOREIGN PATENT DOCUMENTS

| | | |
|---|---|---|
| JP | 2-66187 | 5/1990 |
| JP | 02-078660 | 6/1990 |
| JP | 02-089989 | 7/1990 |
| JP | 2001-500417 | 1/2001 |
| JP | 2006-101914 | 4/2006 |
| JP | 2006-341353 | 12/2006 |
| WO | 98/30336 | 7/1998 |

OTHER PUBLICATIONS

International Search Report (ISR) issued Apr. 17, 2012 in International (PCT) Application No. PCT/JP2012/052246.
International Preliminary Report on Patentability issued Sep. 12, 2013 in corresponding PCT Application No. PCT/JP2012/052246.
Submission of Publication issued Aug. 1, 2014 in corresponding Japanese Patent Application No. 2013-502219 (with English translation).

* cited by examiner

SHOWER APPARATUS

TECHNICAL FIELD

The present invention relates to a shower apparatus used for washing a body or hair in a bathroom of a general home, a bathroom of a hotel, a barbershop, a beauty parlor, a bathhouse, a hot-spring resort or the like.

BACKGROUND ART

A shower head used in a bathroom of a general home, a bathroom of a hotel, a barbershop, a beauty parlor, a bathhouse, a hot-spring resort or the like has: a grip as a shower base end portion for coupling with a water supply source; and a head provided with a water-spraying portion, and, generally, a shower hose is coupled with the grip and the grip is hooked to a supporting hook attached to a wall surface of a bathroom or the like. In a state where such a shower head is supportably hooked to a supporting hook, a direction of the head, which is a jet direction of shower water, becomes fixed and a region, which shower water hits, is determined.

However, when a user takes a shower, shower water sometimes does not reach the users' desired spot due to physical size, standing position or sitting-chair position of the user. In this case, the user needs to move and adjust his/her position or to move the shower head by hand so as to receive shower water at the desired spot.

Japanese Patent Application Laid-Open Publication No. 2006-101914 (JP-2006-101914A, Patent Document 1) discloses a shower apparatus which can select a direction of shower water by freely changing a direction of a head. As means for changing the direction of this type of head, a spherical joint having a water passage therein is provided between a base endportion and the head to change the direction of the head by rotation of the spherical joint.

However, in the case where a jet direction of shower water is adjusted by such a spherical joint, when the head is largely tilted, the water passage penetrating through the spherical joint is closed, or the passage area is reduced. Thus, there occurs a problem that a bending angle cannot be increased and the jet direction cannot be adjusted to a multi-direction, for example, shower water cannot be jetted directly downward.

RELATED ART DOCUMENTS

Patent Documents

Patent Document 1: JP-2006-101914A

SUMMARY OF THE INVENTION

Problems to be Solved by the Invention

An object of the present invention is to provide a user-friendly shower apparatus which can increase a bending angle of a head, to greatly change a selection region of a jet direction of shower water.

Additionally, another object of the present invention is to provide a shower apparatus which can increase a bending angle of ahead, rotate the head, and widely change a direction of the head, which is a jet direction of shower water three-dimensionally.

Means to Solve the Problems

The inventors of the present invention made intensive studies and found that, in a shower apparatus including, between a head provided with a water spraying portion and a shower base end portion (grip) coupled with a water supply source, an angle-adjusting means, particularly an angle-adjusting means having a combination of a bendable pipe capable of retaining a bent form and a bendable water passage communicating with the head and the grip, a bending angle of the head can be increased and a bending state can be fixed without water leakage.

That is, the first embodiment of the invention provides a shower apparatus comprising: a head provided with a water-spraying portion; a base end portion (or a shower base end portion) for coupling with a water supply source; and an angle-adjusting means disposed between the head and the base end portion, for changing a direction of the water-spraying portion to allow a change of a spraying direction of shower water.

Moreover, the water supply source here indicates a shower hose or a water supply pipe for supplying tap water or hot water.

The second embodiment of the invention provides a shower apparatus, wherein the angle-adjusting means comprises: a bendable pipe being bendable and retaining a bent form when it is bent; and a bendable water passage being bendable following bending of the bendable pipe to guide water in a direction from the base end portion toward the head.

The third embodiment of the invention provides a shower apparatus, wherein the bendable pipe is a multi-spherical bendable joint pipe comprising a plurality of spherical joints disposed consecutively, each joint having a male and female spherical surface for rotationally fitting adjacent joints with each other. That is, the male spherical surface can be rotationally fitted in the adjacent female spherical surface.

The fourth embodiment of the invention provides a shower apparatus, wherein the multi-spherical bendable joint pipe comprises: a female-male pipe member having a first end having a female spherical surface and a second end having a male spherical surface; a female pipe member having at least a first end having a female spherical surface; and a male pipe member having at least a first end having a male spherical surface, wherein these pipe members are joined with the male spherical surfaces and the female spherical surfaces rotationally fitted to compose the plurality of the spherical joints.

The fifth embodiment of the invention provides a shower apparatus, wherein the multi-spherical bendable joint pipe includes: a male-male pipe member having first and second ends, each having a male spherical surface; and a pair of female pipe members, each having at least a first end having a female spherical surface, wherein these pipe members are joined with the male spherical surfaces and the female spherical surfaces rotationally fitted to compose the plurality of the spherical joints.

The sixth embodiment of the invention provides a shower apparatus, wherein the multi-spherical bendable joint pipe comprises a female-female pipe member having first and second ends, each having a female spherical surface, and a pair of male pipe members, each having at least a first end having a male spherical surface, wherein these pipe members are joined with the male spherical surfaces and the female spherical surfaces rotationally fitted to compose the plurality of the spherical joints.

The seventh embodiment of the invention provides a shower apparatus, wherein the multi-spherical bendable joint pipe has an adjusting means for adjusting a frictional force on the male spherical surface and the female spherical surface in the multi-spherical bendable joint pipe.

The eighth embodiment of the invention provides a shower apparatus, wherein the multi-spherical bendable joint pipe includes: a pair of female pipe members, composed of first and second female pipe members, each having a first end having an internal female spherical surface and a second end having a joining screw thread; a pair of male pipe members, composed of first and second male pipe members, each having a first end having an external male spherical surface fittable and rotationally and slidingly contactable with the female spherical surface and a second end having a joining screw thread, the first and second male pipe members, each received from the joining screw thread side of each female pipe member, being joinable through the joining of the joining screw threads of the male pipe members; and an adjusting means having an internal female spherical surface fittable and rotationally and slidingly contactable with the male spherical surface of the male pipe member and an external adjusting screw thread for screwing to the joining screw thread of the female pipe member, whereby the multi-spherical bendable joint pipe includes the plurality of the spherical joints.

The ninth embodiment of the invention provides a shower apparatus, wherein the water passage is comprised of a flexible hose.

The tenth embodiment of the invention provides a shower apparatus, wherein the flexible hose is disposed in the inside of the bendable pipe.

The eleventh embodiment of the invention provides a shower apparatus, wherein the flexible hose has at least a first end rotationally joined to the head or the base end portion.

The twelfth embodiment of the invention provides a shower apparatus, wherein the flexible hose surrounds the bendable pipe to be disposed to the outside of the bendable pipe, and the water passage is disposed in the inside of the flexible hose.

The thirteenth embodiment of the invention provides a shower apparatus, wherein the bendable pipe has a watertight structure and has an internal space constituting the bendable water passage.

The fourteenth embodiment of the invention provides a shower apparatus, wherein the bendable pipe has a tube or a film integrally attached to an internal surface or an external surface thereof to form the watertight structure.

Effects of the Invention

According to the first embodiment, since an angle of a head to abase end portion (or a shower base end portion) is changeable, a direction of a water-spraying portion, a jet direction of shower water is changeable. When, for example, a hand-held shower head is used, a grip corresponding to the base end portion is sometimes used in a state of being hooked over and fixed to a wall hook, or the grip is sometimes gripped and operated by hand while a direction of the shower is changed. Since a direction of the head can be adjusted in both cases, the jet direction is selectable and usability is improved.

According to the second embodiment, since an angle-adjusting means includes a bendable pipe being bendable and retaining a bent form when it is bent and a water passage bendable following bending of the bendable pipe to guide water in a direction from the base end portion toward the head, a means for retaining a bent form and a means for ensuring a water passage are separately constituted to function respectively.

According to the third embodiment, since the bendable pipe is a multi-spherical bendable joint pipe comprising a plurality of spherical joints disposed consecutively, each joint having a male and female spherical surface for rotationally fitting adjacent joints with each other, a bending angle of the head can be largely changed, compared with that of a conventional single spherical joint type pipe. Additionally the head is rotatable due to a spherical joint structure, thus the jet direction of shower water can be widely adjusted three-dimensionally.

According to the fourth embodiment, since a female-male pipe member has a first end having a female spherical surface and a second end having a male spherical surface and the female and the male spherical surfaces are respectively rotationally joined to a male spherical surface and a female spherical surface of pipes adjacent to the female-male pipe, a large number of spherical joints can be easily formed. Further, parts are commonly used and the kinds of parts can be reduced.

According to the fifth embodiment, since a male-male pipe member having first and second ends, each having a male spherical surface, and a pair of female pipe members, each having at least a first end having a female spherical surface, are joined with the male spherical surfaces and the female spherical surfaces rotationally fitted, a large number of spherical joints can be easily formed.

According to the sixth embodiment, since a female-female pipe member having first and second ends, each having a female spherical surface, and a pair of male pipe members, each having at least a first end having a male spherical surface, are joined with the female spherical surfaces and the male spherical surfaces rotationally fitted, a large number of spherical joints can be easily formed.

According to the seventh embodiment, since an adjusting means for adjusting a frictional force on a male spherical surface and a female spherical surface is provided, the frictional force on the mutually slidingly moving spherical surfaces can be adjusted, and a frictional force necessary for retaining a bent form or a bending force applied from outside is effectively adjusted, or a frictional force when the slidingly moving surfaces are worn down is effectively restored.

According to the eighth embodiment, since joining screw threads of a pair of male pipe members, each received (or inserted) from a joining screw thread side of each female pipe member, are joined to each other, assembling work of forcibly pushing in while applying strong force is unnecessary, and a frictional force on a male spherical surface and a female spherical surface slidingly contactable with each other can be adjusted by an adjusting means.

According to the ninth embodiment, since the water passage is comprised of a flexible hose, it is bendable following bending of the bendable pipe and thus the water passage extending from the base end portion to the head can be secured bendably.

According to the tenth embodiment, since the flexible hose is disposed in the inside of the bendable pipe, the pipe having a large mechanical strength can protect the flexible hose.

According to the eleventh embodiment, since the flexible hose has at least a first end rotationally joined to the head or the base end portion, when a bendable pipe having a spherical joint structure is axially rotated, at least the first end of the flexible hose rotates in relation to the base end portion or the head, and thus the flexible hose can be prevented from twisting before it happens.

Consequently, not only a bending direction but rotation of the head can be adjusted, and the jet direction of shower water can be widely changed three-dimensionally.

According to the twelfth embodiment, since the flexible hose surrounds the bendable pipe to be disposed to the outside of the bendable pipe and the water passage is disposed in the inside of the flexible hose, the cross-sectional area of the water passage can be secured largely.

According to the thirteenth embodiment, since the bendable pipe has a watertight structure and has an internal space constituting the bendable water passage, the bendable pipe serves as a water passage and no special water passage is required to be provided.

According to the fourteenth embodiment, since the bendable pipe has a tube or a film integrally attached to an internal surface or an external surface thereof to form a watertight structure, a bendable pipe serving as a water passage can be formed.

BRIEF DESCRIPTION OF DRAWINGS

FIGS. 1A-1C are side views of a shower head of a first embodiment, in which FIG. 1(A) shows an upright (non-bending) state of the head, FIG. 1(B) shows the head adjusted to a hanging-down state (state where a crane neck-shaped head hangs down or bends in a gravity direction), and FIG. 1(C) shows the head adjusted to a facing-up state (state where the crane neck-shaped head faces up or bends in a direction against gravity).

FIGS. 13A-13C are front and side views of a shower head of a seventh embodiment, the shower head being, for example, a hand-held shower head used in a barbershop, a beauty parlor or the like, in which FIG. 13(A) is a front view, FIG. 13(B) is a side view, and FIG. 13(C) is a side view of the shower head adjusted to a hanging-down state.

DETAILED DESCRIPTION OF THE INVENTION

Figure 1:
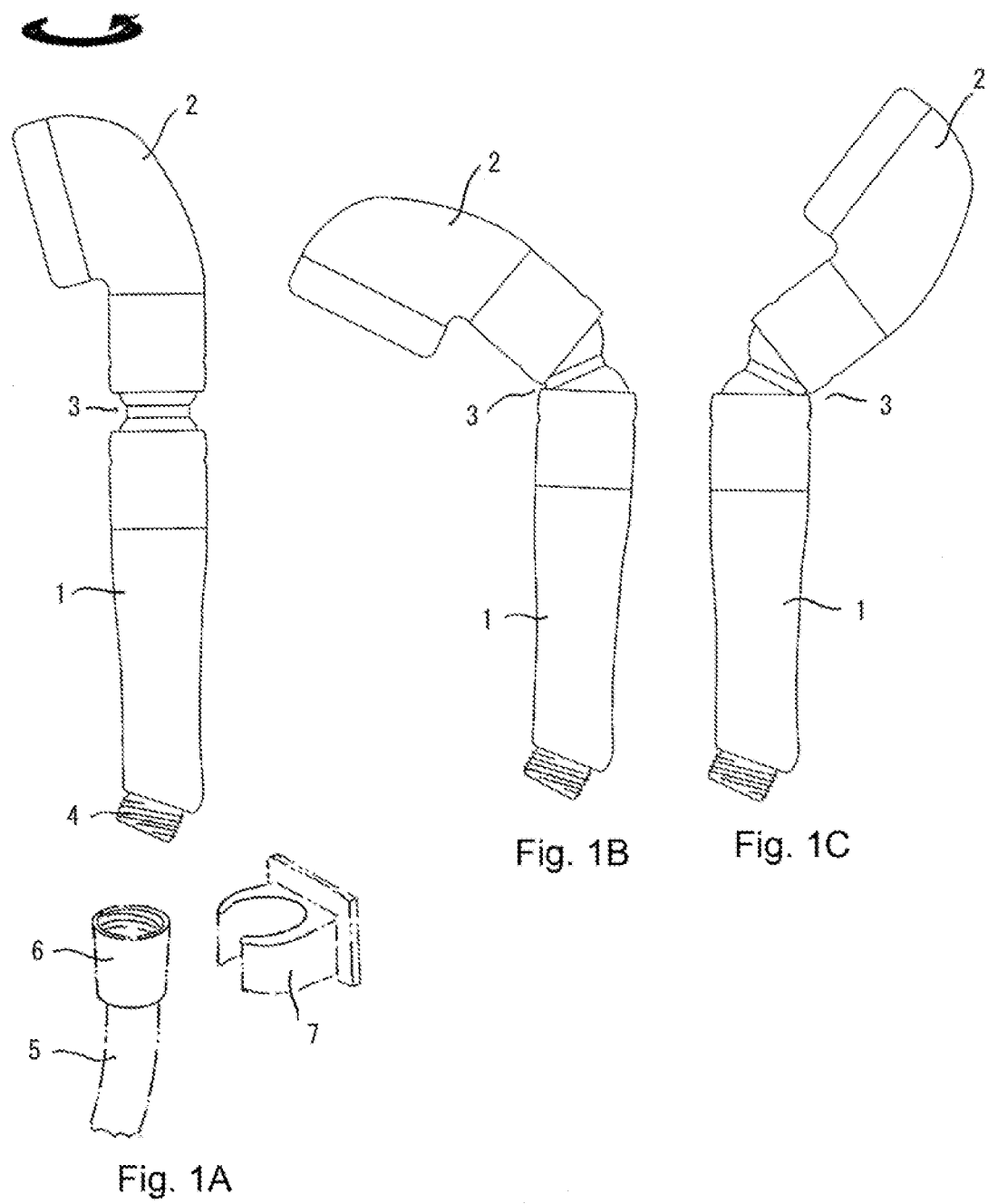

In a shower apparatus of the present invention, an angle-adjusting means may be means capable of freely changing a direction of a water-spraying portion without water leakage (a jet direction of shower water), and capable of fixing the portion in a desired direction, and can be formed by a combination of a bendable pipe retaining a bent form and a bendable water passage, bendable following bending of the bendable pipe, to guide water in a direction from a base end portion (grip) toward a head. The angle-adjusting means may be a member serving as a joint interposed between the grip and the head.

(Flexible Hose)

The water passage has a hollow portion, through which water can pass, and can be comprised of (or formed of) a bendable flexible hose (a hollow hose having a circular cross section). The flexible hose may be disposed in a hollow portion of a bendable pipe, or the bendable pipe may be disposed in the hollow portion of the flexible hose. In a state where the bendable pipe is disposed in the hollow portion of the flexible hose, water may pass through a gap between an internal wall (internal surface) of the flexible hose and an external wall (external surface) of the bendable pipe, or pass through the hollow portion of the bendable pipe. Moreover, the flexible hose may be a hose (for example, a thin tube or a thin film) disposed in close contact with or in proximity to the bendable pipe.

The flexible hose is formed of bendable material such as a synthetic resin or a rubber. The flexible hose is, preferably in terms of flexibility, a hose formed of a soft resin (an olefinic resin, a soft vinyl chloride-series resin, a urethane-series resin, a thermoplastic elastomer or the like) or a rubber (a synthetic rubber such as a nitrile rubber or a silicone rubber, a natural rubber or the like), and is, more preferably in terms of durability, safety or the like in addition to the flexibility, a synthetic rubber hose (particularly, a silicone rubber hose). Although the flexible hose may have a bellows structure, the hose generally employs a non-bellows (straight) structure. Specifically, the flexible hose may be a hose for tap water, a pressure-resistant hose such as a fiber-reinforced hose, a silicone rubber hose, or the like.

When the flexible hose is disposed in the bendable pipe, the hose may be adhered and fixed to the hollow portion of the bendable pipe, the grip and the head with use of adhesive or the like. However, for preventing the flexible hose from twisting by rotation (or turn) of the bendable pipe, the flexible hose is preferably rotationally formed. Specifically, a method for rotationally forming a flexible hose is not particularly limited as long as the hose is rotationally formed in a state where a joining portion between the hose and the grip and/or a joining portion between the hose and the head are/is watertight (in no water leakage). In terms of easiness, a method is preferably employed that fits the flexible hose in hose insertion ports/port (recesses/recess) of the grip and/or the head via ring-shaped seal members/member (O-rings/O-ring).

The material of the ring-shaped seal member may include a natural rubber, a synthetic rubber or the like in terms of improvement of watertightness. Further in terms of durability, safety or the like, the material is preferably a synthetic rubber (particularly, a silicone rubber). By interposition of the ring-shaped seal member, water is prevented from leaking from a fitting portion, and the flexible hose can be rotated at 360° even if being combined with the bendable pipe.

When the flexible hose is formed of a soft material such as a rubber, it is allowed that the flexible hose is formed by a soft hose and connector/connectors attached to opening end portion/portions of the hose and the connector is fitted with the hose insertion port (recess) via the ring-shaped seal member. The connector may be attached to at least one of the opening ends of the soft hose so as to be rotatable with either the grip or the head. However, the connectors are preferably attached to both the opening end portions so that the head can smoothly rotate.

A method for attaching the connector to the soft hose is not particularly restricted. Although adhesive may be used, a method for inserting and fixing an end portion of the connector into a hollow portion of the soft hose with use of plasticity of the soft material (particularly, elasticity of a rubber) is employable in terms of easiness. In this method, it is preferable to form circumferentially extending projections (for example, fine projections) on a surface of the end portion of the connector to fix the connector to the hose, and more preferably, for easily and strongly fixing the connector to the hose, to form a barbed portion at the end portion of the connector. The barbed portion is a barb-shaped end portion, in detail, an attachment end portion having circumferentially extending projections (for example, fine projections) on its surface, the projection having an inclined surface that a height of an opening end portion side is lower. The connector having such projections is easily inserted in the hollow portion of the soft hose and hardly pulled out therefrom. Additionally, a recess for fitting on the projection of the connector may be formed on an internal surface of the soft hose.

A recess, in which the ring-shaped seal member is installed and fixed, may be circumferentially formed on a surface of the connector. As a material of the connector, for example, a hard synthetic resin such as a polypropylene resin or an ABS resin is generally used.

On the other hand, when the bendable pipe is disposed in the flexible hose, since a twisting of the flexible hose can be visually recognized and easily untwisted, the flexible hose may be fixed to the grip and the head. As a method for watertightly attaching the flexible hose to the grip and the head, for example, a method for fastening the flexible hose and the grip or the head by a hose band formed of a metal or the like, or a method for fixing the flexible hose and the grip or the head by an adhesive is used.

The length of the flexible hose can be selected in accordance with the type of a shower apparatus. The hose is, for example, about 10 to 20 mm, preferably, about 30 to 80 mm, and more preferably about 50 to 100 mm in length.

An internal diameter of the flexible hose can also be selected in accordance with the type of a shower apparatus. For example, when the flexible hose is disposed in the hollow portion of the bendable pipe, the internal diameter may be the same as each flow passage diameter of the grip and the head, and is, for example, about 3 to 30 mm, preferably about 5 to 20 mm, and more preferably about 8 to 15 mm. When the bendable pipe is disposed in the hollow portion of the flexible hose, the internal diameter of the flexible hose is, for example, about 5 to 100 mm, preferably about 10 to 50 mm, and more preferably about 15 to 40 mm.

The flexible hose have a thickness of, for example, 0.3 to 10 mm, preferably, 0.5 to 8 mm, more preferably, 1 to 5 mm.

(Bendable Pipe)

The bendable pipe may be a hollow pipe (hollow pipe having a circular cross section), being bendable and capable of retaining a bent form. Preferably, a pipe having spherical joints (spherical splices or spherical joint structures) is used, the pipe being excellent in bendability and bent form retaining performance. Since a spherical surface (female spherical surface) of an internal wall (internal surface) of a pipe member is rotationally fitted (spherically fitted) on a spherical surface (male spherical surface) of an external wall (external surface) of another pipe member having the same curvature as that of the female spherical surface in the spherical joint, one of the pipe members does not come out from the other and the pipe can be rotated at 360° and largely bent. Thus, when the bendable pipe is combined with the flexible hose capable of rotating, a shower water-spraying direction can be widely (three-dimensionally) changed. Additionally, since the female spherical surface and the male spherical surface having the same curvature are brought into close and slide-contact with each other to generate a proper frictional force, a form after bending can be retained.

The shapes of the male spherical surface and the female spherical surface are partly spherical surfaces. The shapes are not particularly restricted as long as the pipe member having the male spherical surface does not come out and is rotatable. The shape of a cross section in an axial direction of the spherical surface may be a partial circle including a circle diameter.

One or more spherical joint(s) may be used. A plurality of, for example, about 2 to 10, preferably about 2 to 8, and more preferably about 2 to 6 (particularly, about 2 to 5) spherical joints are used in terms of the high degree of freedom of rotation and easiness of changing a direction of the head. When two or more spherical joints are used, the direction of the head can be easily changed at a large angle. When, for example, 2 to 4, preferably 2 to 3 (particularly, 2) spherical joints are used, the direction of the head can be changed by simple structure.

The bendable pipe may have a joining portion or a joint (screwable joining screw thread or the like) other than the spherical joint. Particularly, for raising watertightness of joining portions of the pipe, the joining portion joining to the head and the grip preferably has joining screw threads for screwing to the head and the grip.

The plurality of pipe members are combined with each other by joining the spherical joints or other joining portions in the bendable pipe. As each pipe member, the following pipe members are usable: a female-male pipe member (a pipe member having a female spherical surface on an internal wall of a first end, and having a male spherical surface on an external wall of a second end); a female-female pipe member (having a female spherical surface on each internal wall of both ends); a male-male pipe member (having a male spherical surface on each external wall of both ends); a female pipe member (having a female spherical surface on an internal wall of a first end, and having a joining portion such as a joining screw thread on an internal wall or an external wall of a second end); a male pipe member (having a male spherical surface on an external wall of a first end, and having a joining portion such as a joining screw thread on an internal wall or an external wall of a second end); and the like. Although the number of pipe members to be combined is not particularly restricted, for example about 2 to 10, preferably about 3 to 8, and more preferably about 3 to 6 (particularly, about 3 to 5) pipe members are combined.

These pipe members can be used by properly being combined in a manner that the male spherical surface and the female spherical surface fit each other. As a method for fitting the male spherical surface and the female spherical surface with each other, for example, the following methods are usable: a method for, with use of plasticity of the pipe member, making the male spherical surface and the female spherical surface face each other and applying pressure to the members to fit the members with each other (forcibly inserting method); and a method for fitting the members with each other by making a second end of a female pipe member (female pipe) having a first end having a female spherical surface have a size that a pipe member having a male spherical surface can pass through, and inserting the pipe member having the male spherical surface from the second end. The latter method is preferably used, because a pipe member formed of polyacetal resin or the like having high rigidity can be used, a fitting state can be adjusted by combining the female pipe member with an adjusting means and forcibly insertion is not required.

As the adjusting means, there is no specific means if the adjusting means can fix a pipe member having a male spherical surface to be inserted and fitted in the female pipe member. An adjusting ring is preferably used, which has an external wall (external surface) formed by a joining screw thread (adjusting screw thread) and an internal wall (internal surface) formed by a female spherical surface. The joining screw thread of the external wall of the adjusting ring is screwed to the joining screw thread of the female pipe member so that a pipe member having the male spherical surface can be fixed to the female pipe member. Additionally, the female spherical surface of the internal wall of the adjusting ring is combined with the female spherical surface of the female pipe member to be spherically fitted with the male spherical surface. Thus, by adjusting the degree of screwing of the joining screw thread (adjusting screw thread), a frictional force of the female spherical surface and the male spherical surface can be adjusted, and a fitting state can be adjusted so as to have desired rotatability and fixability.

As a bendable pipe in which the above pipe members are combined, the following pipes are usable: a pipe (shown in FIGS. 2 and 12) in which the male pipe member and the female pipe member are spherically fitted with both ends of the female-male pipe member; a pipe (shown in FIG. 5) in which the female pipe members are spherically fitted with both ends of the male-male pipe members; a pipe (shown in FIG. 7) in which the male pipe members are spherically fitted with both ends of the female-female pipe members; a pipe (shown in FIGS. 9 and 14) in which the female pipe members each are spherically fitted with each end of the male pipe members screwed to each other by their joining screw threads; a pipe in which the male pipe members each are spherically fitted with each end of the female pipe members screwed to each other by their joining screw threads; a pipe (shown in FIG. 11) in which the male pipe member and the female pipe member are respectively spherically fitted with the both ends of the female-male pipe members spherically fitted with each other; and the like.

Among these bendable pipes, a bendable pipe is preferably used, which includes at least the female pipe member, and has a combination of the female pipe member and the adjusting ring, because even pipe members formed of a hard material can be easily fitted with each other and the fitting state can be adjusted by the adjusting ring. Further, a bendable pipe is more preferably used in which the female pipe members are spherically fitted with both ends of the male pipe members screwed to each other by their joining screw threads (particularly, a bendable pipe in which the female pipe members combined with the adjusting rings are respectively spherically fitted with both ends of a pipe formed by screwing a male pipe member having a joining screw thread on an internal wall of a second end to another male pipe member having a joining screw thread on an external wall of a second end by their joining screw threads), because a proper distance can be formed between the spherical joints and the pipe can be easily bent.

A material of the bendable pipe may include, for example, a hard synthetic resin such as: an olefinic resin such as a polyethylene resin or a polypropylene resin; a hard vinyl chloride-series resin; a styrene-series resin such as an ABS resin; a polyacetal resin such as a polyoxymethylene resin; or a polycarbonate resin. Among the resins, a polyacetal resin such as a polyoxymethylene resin is excellent in wear resistance, and durability even when the spherical joint is repeatedly used, and thus is preferably used.

The bendable pipe may have the same length as that of the flexible hose. The average internal diameter of the bendable pipe is about ⅕ to 5 times, preferably, about ¼ to 4 times, and more preferably about ⅓ to 3 times to the internal diameter of flexible hose.

EMBODIMENTS

Although shower apparatuses of several embodiments of the present invention will be described below, a shower apparatus of the present invention is not limited to the apparatuses of the embodiments.

First Embodiment

Figure 2:
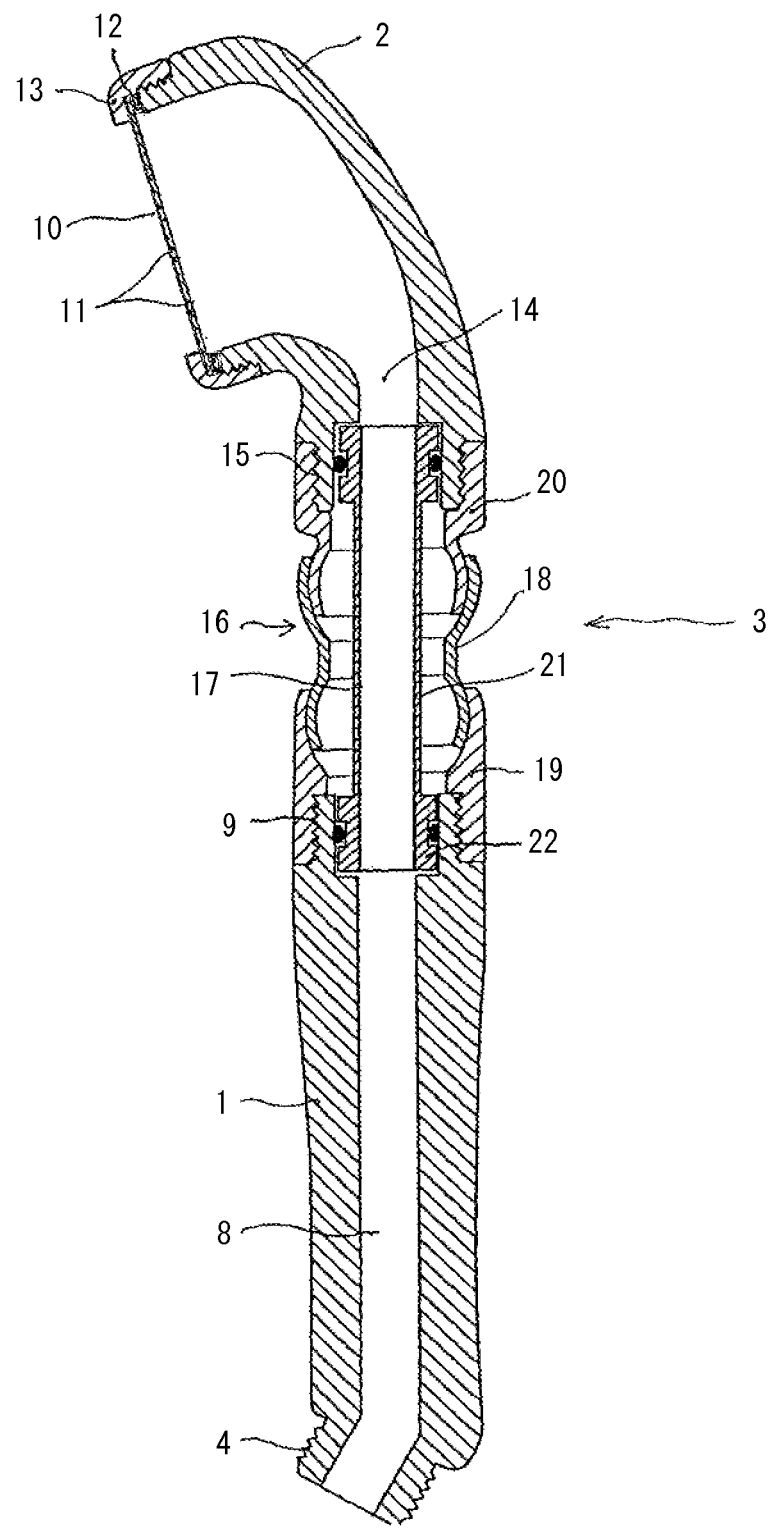
FIG. 2 is a cross-sectional view of the shower head of FIG. 1.
Figure 3:
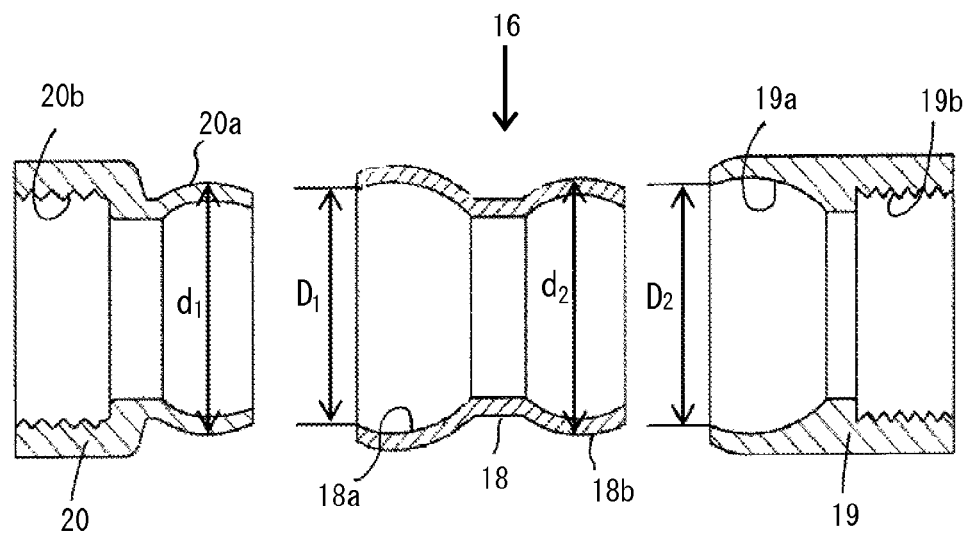
FIG. 3 is an exploded cross-sectional view of a bendable pipe used in the shower head of FIG. 1.
Figure 4:
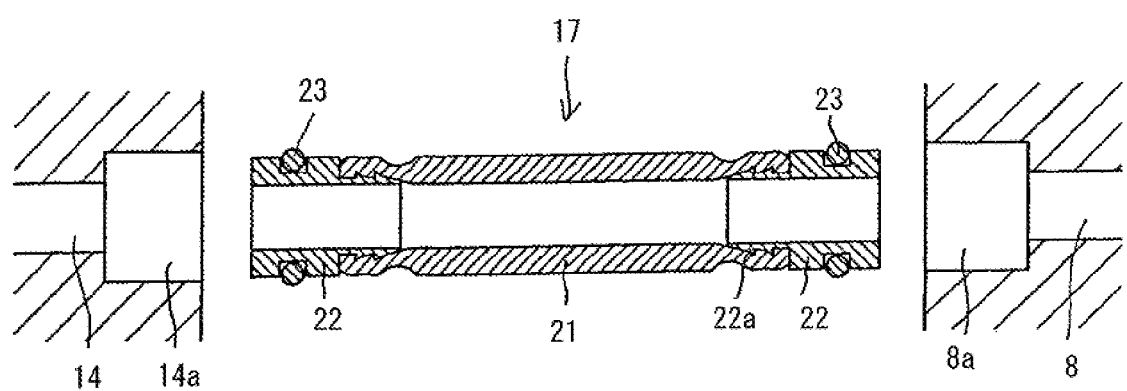
FIG. 4 is a cross-sectional view of a flexible hose used in the shower head of FIG. 1.

A first embodiment will be described with reference to FIGS. 1 to 4. FIGS. 1A-1C are side views showing a use state of a hand-held shower head which is coupled with a shower hose and used in a bathroom of a general home, a bathroom of a hotel, a bathhouse, a hot-spring resort or the like, and FIG. 1(A) shows an upright state, FIG. 1(B) shows the head adjusted to a hanging-down state, FIG. 1(C) shows the head adjusted to a facing-up state, FIG. 2 is a cross-sectional view of the shower head, FIG. 3 is an exploded cross-sectional view of a bendable pipe used in the shower head, and FIG. 4 is a cross-sectional view of the flexible hose used in the shower head.

A grip 1 and a head 2 as a base end portion which constitute the shower head shown in the figures are formed of a synthetic resin and separated from each other.

An angle-adjusting means 3 capable of adjusting a direction of the head is provided between the grip 1 and the head 2.

The grip 1 has a coupling screw thread 4 at the base end portion, and the screw thread 4 is coupled with a metal hose fitting (or resin-made fitting) 6 attached to a shower hose 5 as a water supply source. The shower hose 5 is coupled with a combination faucet or the like (not shown) as a water supplying apparatus. The hose fitting 6 is inserted into a U-shaped supporting hook 7 attached to a wall of a bathroom so that the shower head is attachably/detachably supported on the supporting hook 7.

A grip-side water passage 8 extending from a base end to a top end is formed in the grip 1. A hose insertion port 8a (see FIG. 4) is formed at a top end of the water passage 8. A joining screw thread 9 is formed at the top end of the grip 1.

The head 2 includes a water-spraying plate 10 on a front surface thereof, and a number of water-spraying holes 11 are formed in the water-spraying plate 10. The water-spraying plate 10 is detachably attached to the head 2 by a pressing ring 13 via a packing member 12 made of a rubber or the like retaining watertightness.

A head-side water passage 14 for guiding water (hot water) flowing from the grip side to the water-spring plate 10 is formed in the head 2, and a hose insertion port 14a (see FIG. 4) is formed at a base end portion, opposite to the grip 1, of the head-side water passage 14. A joining screw thread 15 is formed at a base end portion of the head 2.

The angle-adjusting means 3 provided between the grip 1 and the head 2 will be described. The angle-adjusting means 3 includes a bendable pipe 16 and a flexible hose 17 which is disposed in the bendable pipe 16 and serves as a water passage for guiding water from the grip side to the head side.

The bendable pipe 16, for widely adjusting a direction of the head 2 relative to the grip 1 three-dimensionally, can bend and rotate by external force applied by hands, and, when the external force is removed, retains the bent form and stays at a position after rotation.

In the embodiment, as shown in FIG. 3, the bendable pipe 16 comprises one female-male pipe member 18, a female pipe member 19 having at least a first end having a female spherical surface, and a male pipe member 20 having at least a first end having a male spherical surface; each of these pipe members is made of a synthetic resin (a metal is also possible).

The female-male pipe member 18 has a hollow pipe structure including at least a first end having an internal female spherical surface (approximately hemispherical surface) 18a and a second end having an external male spherical surface 18b having a curvature equal to that of an external surface of the female spherical surface of the female pipe member.

The female pipe member 19 having at least the first end having the female spherical surface has a hollow pipe structure including at least a first end having an internal female spherical surface 19a having a curvature equal to that of an external surface of the male spherical surface and a second end having, in the embodiment, a joining screw thread 19b.

The male pipe member 20 having at least the first end having the male spherical surface has a pipe structure including at least a first end having an external male spherical surface 20a having a curvature equal to that of the female spherical surface and a second end having, in the embodiment, an internal joining screw thread 20b.

Among the female-male pipe member 18, the female pipe member 19 and the male pipe member 20, the male spherical surfaces 18b and 20a are rotationally fitted with the female spherical surfaces 19a and 18a of the adjacent pipe members respectively. In this case, a diameter D1 of an opening of the female spherical surface 18a side of the female-male pipe member 18 is smaller (narrower) than an external diameter d1 of the male spherical surface 20a of the male pipe member 20, and an external diameter d2 of the male spherical surface 18b of the female-male pipe member 18 is larger than a diameter D2 of an opening of the female spherical surface 19a side of the female pipe member 19. Moreover, d1 equals to d2, and D1 equals to D2.

Accordingly, by applying strong force to and forcibly pushing the male spherical surfaces 18b and 20a into the female spherical surfaces 19a and 18a respectively, the male spherical surface is inserted and fitted in the female spherical surface, and coupled with each other so as not to come out from each other.

A pipe having such a joining structure constitutes a spherical joint structure that the male spherical surfaces 18b and 20a and the female spherical surfaces 19a and 18a are rotationally joined to each other and slidingly contactable with each other at a predetermined frictional force due to the equal curvatures. Such joints are formed at two positions.

Therefore, the pipe joining body constitutes the bendable pipe 16 bendable at two positions as a whole. By screwing the joining screw threads 19b and 20b formed on internal surfaces at both ends of the pipe 16 to the joining screw thread 9 formed on an external surface of the end portion of the grip and the joining screw thread 15 formed on an external surface of the end portion of the head respectively, the bendable pipe 16 is installed between the grip 1 and the head 2 to mechanically join the grip 1 and the head 2 to each other.

The flexible hose 17 as a water passage is disposed in the bendable pipe 16. As shown in FIG. 4, in the flexible hose 17, insertion connectors 22, 22 are provided at both ends of a rubber hose 21, for example, a hose for tap water, a pressure-resistant hose such as a fiber-reinforced hose, a silicone rubber hose, and O-rings 23, 23 as rubber ring-shaped seal members are attached to the connectors 22, 22. The insertion connector 22 has a barbed portion (barb-shaped end portion) 22a, and each end portion of the rubber hose 21 is pushed onto the barbed portion 22a.

By inserting the connectors 22, 22 at both ends in the hose insertion port 8a of the grip-side water passage 8 and the hose insertion port 14a of the head-side water passage 14, the flexible hose 17 is positioned on an axis connecting between the grip 1 and the head to guide water supplied from the shower hose 5 from the grip-side water passage 8 to the head-side water passage 14.

When the connectors 22, 22 at both ends are inserted in the hose insertion port 8a and the hose insertion port 14a, the O-rings 23, 23 come into close contact with internal circumferential surfaces of the hose insertion ports 8a and 14a to prevent water leakage, and the O-rings 23, 23 come into slide-contact with the internal circumferential surfaces of the hose insertion ports 8a and 14a to enable the flexible hose 17 to rotate in relation to the grip 1 and the head 2.

Operation of the first embodiment having such a constitution will be described.

Since the shower head has the grip 1, a user can operate the shower head by gripping the grip 1, and can direct shower water, toward a desired spot of a body by operating a direction of the shower water by a hand gripping the grip in a state of shower water jetting from the water-spraying plate 10.

When both hands are used, the shower head is hooked over the supporting hook 7 attached to a wall of a bathroom and used. In this state, a direction of the water-spraying plate 11, the jet direction of shower water, is fixed. When a user wants to change a direction of shower water from this state, the user holds the head 2 and applies force to the head 2 to change the direction to an intended direction.

In the bendable pipe 16, spherical joints, each in which the male spherical surface and the female spherical surface are fitted with each other, are formed between the female-male pipe member 18 and the female pipe member 19, and between the female-male pipe member 18 and the male pipe member 20, and thus the pipe members 18, 19 and 20 relatively rotate thereamong. That is, the bendable pipe 16 can be bent in any direction, and the pipe members can axially rotate relatively therebetween. The direction of the head 2 can be changed by bending the bendable pipe 16 as shown in FIGS. 1(B) and (C), or the head can be rotated as indicated by the arrow in FIG. 1(A). Thus, the jet direction of shower water can be widely changed three-dimensionally.

Particularly, since the bendable pipe 16 has the spherical joints, each in which the female spherical surface and the male spherical surface are slidingly contactable with each other, at two positions, a bending angle can be changed larger than that of a conventional pipe having a bending point at one position, and the jet direction of shower water can be selected over a wider range. Thus, making the shower head more user-friendly for example, shower water can be jetted just downward.

Additionally, since a structure of fitting of the female spherical surface and the male spherical surface is slidingly contact with each other, friction is generated therebetween to enable a bent form and an attitude after rotation to be retained.

When the bendable pipe 16 is bent, the bendable flexible hose 17 disposed therein is also bent following the bending of the bendable pipe 16.

A twisting force is applied to the flexible hose 17 when the head 2 is axially rotated. However, since the O-rings 23, 23 at both ends of the rubber hose 21 are slidingly contactable with the internal circumferential surfaces of the hose insertion ports 8a and 14a and rotate in relation to the head on the contact surfaces, a twisting of the flexible hose 17 can be prevented. In this case, since the O-rings 23, 23 come into contact with the internal circumferential surfaces of the hose insertion ports 8a and 14a at a small contact area, resistance is small, the hose smoothly rotates and a twisting of the hose can be prevented.

The flexible hose 17 thus bends following bending and rotation of the bendable pipe, so that a water passing route can be reliably ensured and water leakage can be prevented.

In the bendable pipe 16 of the embodiment, since one female-male pipe member 18 is used, the female spherical surfaces and the male spherical surfaces are fitted at two positions, and the spherical joints are formed at the two positions. However, if two female-male pipe members 18 are joined to each other, spherical joints are formed at four positions and the bending angle can be further largely changed. Therefore, a large number of female-male pipe members 18 may be used.

Second Embodiment

Next, a second embodiment will be described with reference to FIGS. 5 and 6.

Figure 5:
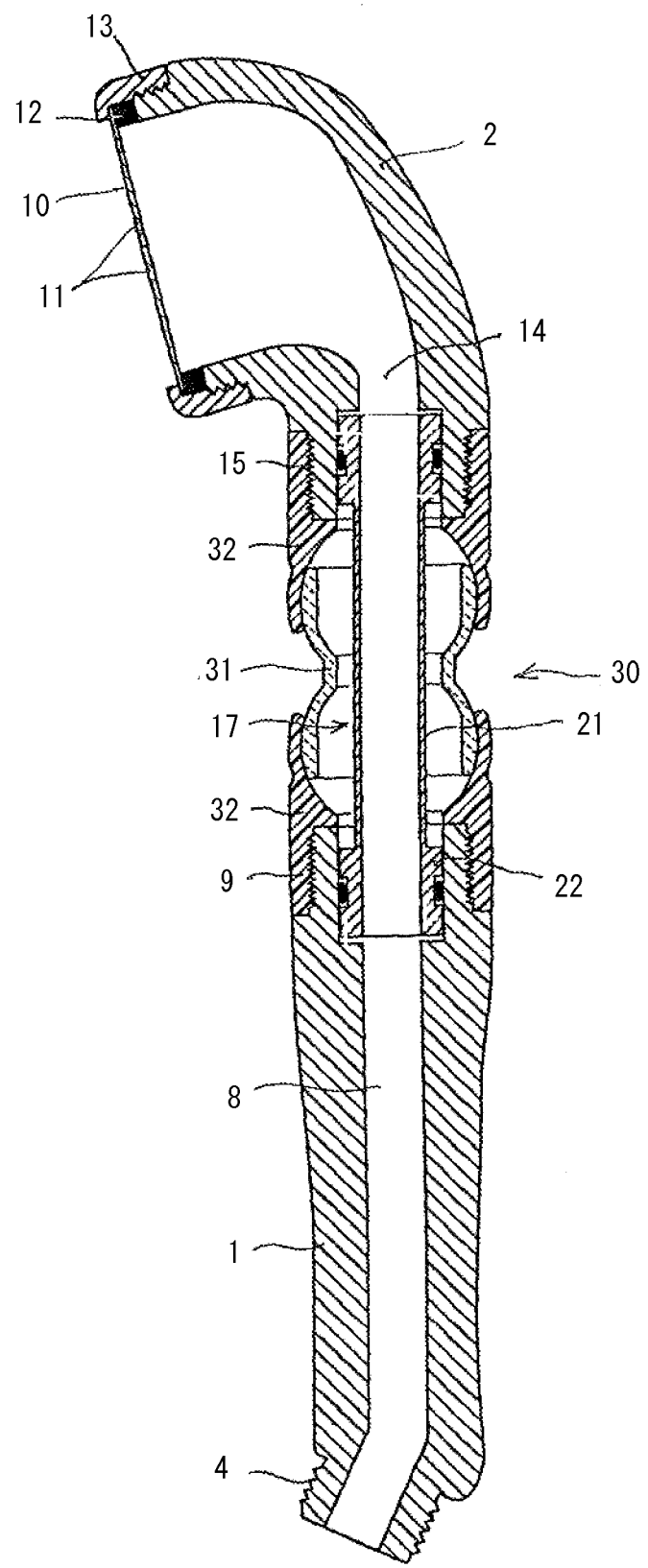
FIG. 5 is a cross-sectional view of a shower head of a second embodiment.
Figure 6:
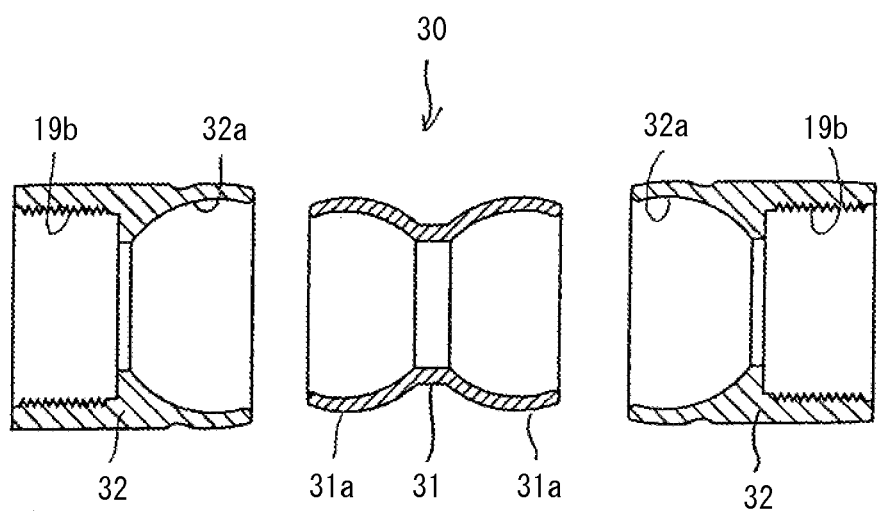
FIG. 6 is an exploded cross-sectional view of a bendable pipe used in the shower head of FIG. 5.

FIG. 5 is a cross-sectional view of a shower head of a second embodiment, and FIG. 6 is an exploded cross-sectional view of a bendable pipe used in the shower head. The structure of a bendable pipe 30 of the second embodiment is different from the bendable pipe 16 of the first embodiment. Since members other than the bendable pipe 30 may be the same as those of the first embodiment, the same symbols are attached to the same members and description thereof will be omitted.

The bendable pipe 30 of the embodiment includes one male-male pipe member 31 and two female pipe members 32, 32 each having at least a first end having a female spherical surface; each of these pipe members is made of a synthetic resin.

The male-male pipe member 31 has a hollow pipe structure including both ends each having at least an external male spherical surface 31a.

Additionally, the female pipe members 32, 32 of the embodiment having at least the first end having the female spherical surface have a hollow pipe structure including a first end having at least an internal female spherical surface 32a having a curvature equal to that of an external surface of the male spherical surface and a second end having the joining screw thread 19b.

The male-male pipe member 31 and the female pipe members 32, 32 are joined to each other in a manner that the male spherical surfaces 31a, 31a and the female spherical surfaces 32a, 32a of the adjacent pipe members are rotationally fitted with each other. In this case, the fitting is performed in a manner of forcibly pushing into/onto.

A pipe having such a joining structure constitutes a spherical joint structure that the male spherical surfaces 31a, 31a and the female spherical surfaces 32a, 32a are rotationally joined to each other and slidingly contactable with each other at a predetermined frictional force due to the equal curvatures. Such joints are formed at two positions.

Thus, this pipe joining body constitutes the bendable pipe 30 as a whole.

By screwing the joining screw threads 19b, 19b formed on internal surfaces at both ends of the pipe 30 to the joining screw thread 9 formed on the external surface of the end portion of the grip side and the joining screw thread 15 formed on the external surface of the end portion of the head side respectively, the bendable pipe 30 is installed between the grip 1 and the head 2 to mechanically join the grip 1 and the head 2 to each other.

The flexible hose 17 having the same structure as that shown in FIG. 4 is disposed in the bendable pipe 30.

In the second embodiment having such a constitution, if necessary, the bendable pipe 30 is bent or rotated to change the direction of the head 2, and thus the jet direction of shower water can be widely changed three-dimensionally.

Also in this case, since the bendable pipe 30 has the spherical joints, each in which the female spherical surface and the male spherical surface are jointed to each other, at the two positions, a bending angle can be largely changed.

Also in the embodiment, since the flexible hose 17 having the same structure as that shown in FIG. 4 is disposed inside the bendable pipe 30, the flexible hose 17 bends following bending of the bendable pipe 30. Additionally, even if the bendable pipe 30 is rotated, since the O-rings 23, 23 are slidingly contactable with the hose insertion port 8a and 14a, the flexible hose 17 can be prevented from twisting.

The flexible hose 17 thus bends following bending and rotation of the bendable pipe, so that a water passing route can be ensured.

Additionally, since the bendable pipe 30 can be constituted by one kind of male-male pipe member 31 and one kind of female pipe members 32 in the embodiment, the number of components can be reduced.

Moreover, in the structure of the second embodiment, if another female spherical surface 32a is formed in place of the joining screw thread 19b of each female pipe member 32, another male-male pipe member 31 can be joined to the newly formed female spherical surface 32a and thus the number of spherical joining points, each at which the female spherical surface and the male spherical surface are joined to each other, can be increased, thereby adjusting the bending angle over a wider range.

Third Embodiment

Next, a third embodiment will be described with reference to FIGS. 7 and 8.

Figure 7:
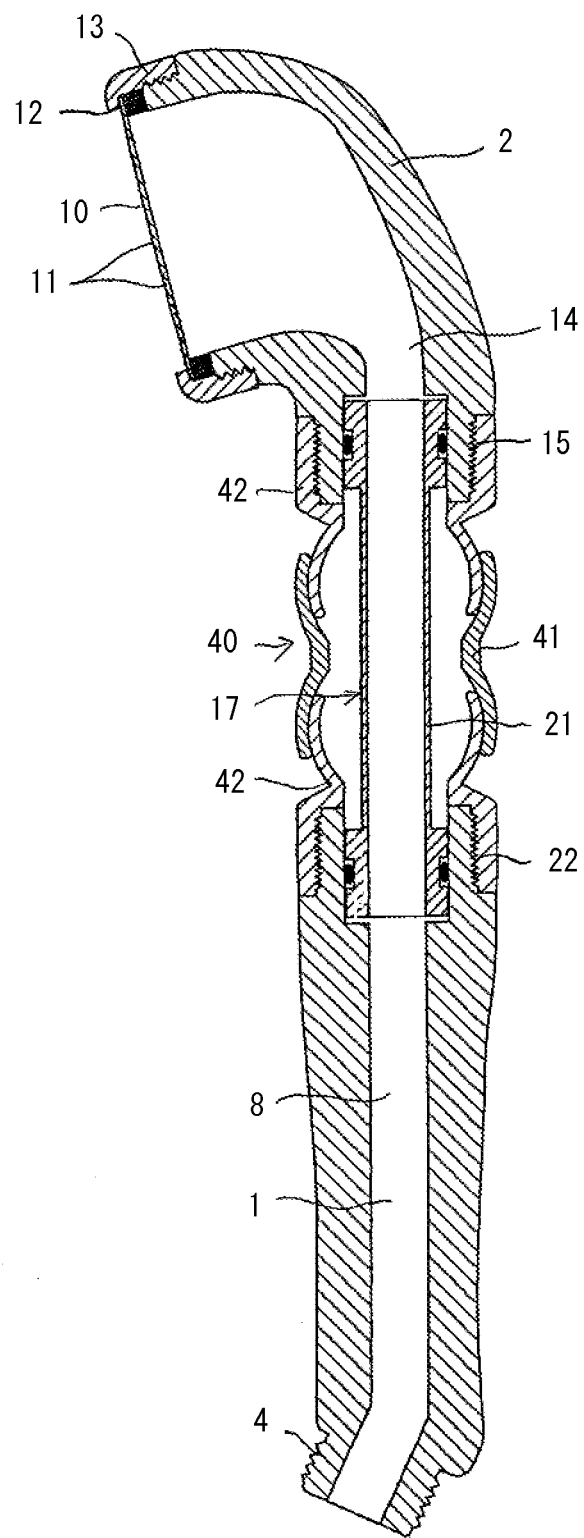
FIG. 7 is a cross-sectional view of a shower head of a third embodiment.
Figure 8:
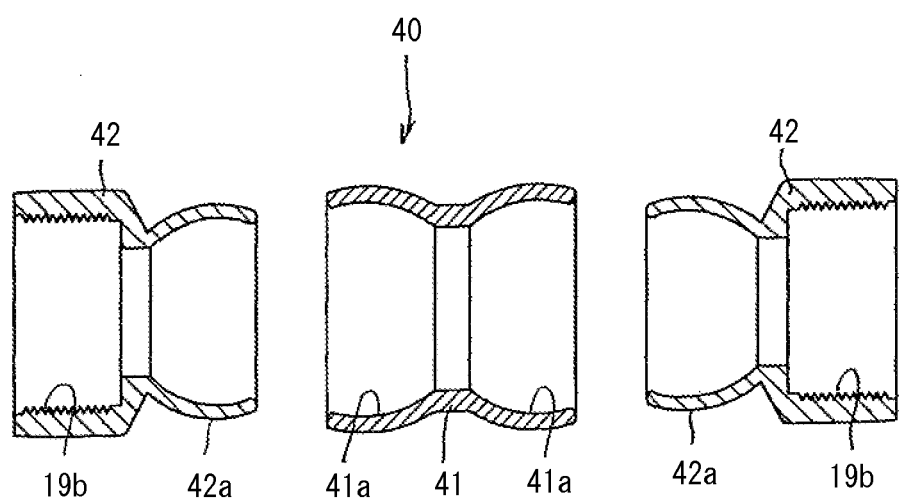
FIG. 8 is an exploded cross-sectional view of a bendable pipe used in the shower head of FIG. 7.

FIG. 7 is a cross-sectional view of a shower head of the third embodiment, and FIG. 8 is an exploded cross-sectional view of a bendable pipe used in the shower head.

In the third embodiment, a bendable pipe 40 having a structure different from that of the bendable pipe 16 of the first embodiment is used in place of the pipe 16. Since members other than the bendable pipe 40 may be the same as those of the first embodiment, the same symbols are attached to the same members and description thereof will be omitted.

The bendable pipe 40 of the embodiment includes one female-female pipe member 41 and two male pipe members 42, 42 each having at least a first end having a male spherical surface; each of these pipe members is made of a synthetic resin.

The female-female pipe member 41 has a hollow pipe structure including both ends each having at least an internal female spherical surface 41a, 41a.

Additionally, the male pipe members 42, 42 of the embodiment having at least the first end having the male spherical surface has a hollow pipe structure including a first end having at least an external male spherical surface 42a having a curvature equal to that of an internal surface of the female spherical surface and a second end having the joining screw thread 19b.

The female-female pipe member 41 and the male pipe members 42, 42 are joined to each other in a manner that the female spherical surfaces 41a, 41a and the male spherical surfaces 42a, 42a of the adjacent pipe members are rotationally fitted with each other. Also in this case, the fitting is performed in a manner of forcibly pushing into/onto.

A pipe having such a joining structure constitutes a spherical joint structure that the female spherical surfaces 41a, 41a and the male spherical surfaces 42a, 42a are rotationally joined to each other and slidingly contactable with each other at a predetermined frictional force due to the equal curvatures. Such joints are formed at two positions.

Thus, this pipe joining body constitutes the bendable pipe 40 as a whole.

By screwing the joining screw threads 19b, 19b formed on internal surfaces of both ends of the pipe 40 to the joining screw thread 9 formed on the external surface of the end portion of the grip and the joining screw thread 15 formed on the external surface of the end portion of the head respectively, the bendable pipe 40 is installed between the grip 1 and the head 2 to mechanically join the grip 1 and the head 2 to each other.

The flexible hose 17 having the same structure as that shown in FIG. 4 is disposed in the bendable pipe 40.

In the third embodiment having such a constitution, the bendable pipe 40 is bent or rotated by applying force to the head to change the direction of the head 2, and thus the jet direction of shower water can be widely changed three-dimensionally.

Also in this case, since the bendable pipe 40 has the spherical joints, each in which the female spherical surface and the male spherical surface are jointed to each other, at two positions, a bending angle can be largely changed.

Also in the embodiment, since the flexible hose 17 is disposed in the bendable pipe 40 in the same structure as that shown in FIG. 4, the rubber hose 21 (the flexible hose 17) bends following bending of the bendable pipe 40. Additionally, even if the bendable pipe 40 is rotated, since the O-rings 23, 23 are slidingly contactable with the hose insertion ports 8a and 14a, the flexible hose 17 can be prevented from twisting. Thus, the flexible hose 17 can ensure a water passing route.

Additionally, since the bendable pipe 40 of the embodiment can be constituted by one kind of female-female pipe member 41 and one kind of male pipe members 42 similarly to the second embodiment, the number of components can be reduced.

Moreover, also in the structure of the third embodiment, if another male spherical surface 42a is formed in place of the joining screw thread 19b of each male pipe member 42, 42, another female-female pipe member 41 can be joined to the newly formed male spherical surface 42a and thus the number of spherical joining points, each at which the female spherical surface and the male spherical surface are joined to each other, can be increased, thereby adjusting the bending angle over a wider range.

Fourth Embodiment

Next, a fourth embodiment will be described with reference to FIGS. 9 and 10.

Figure 9:
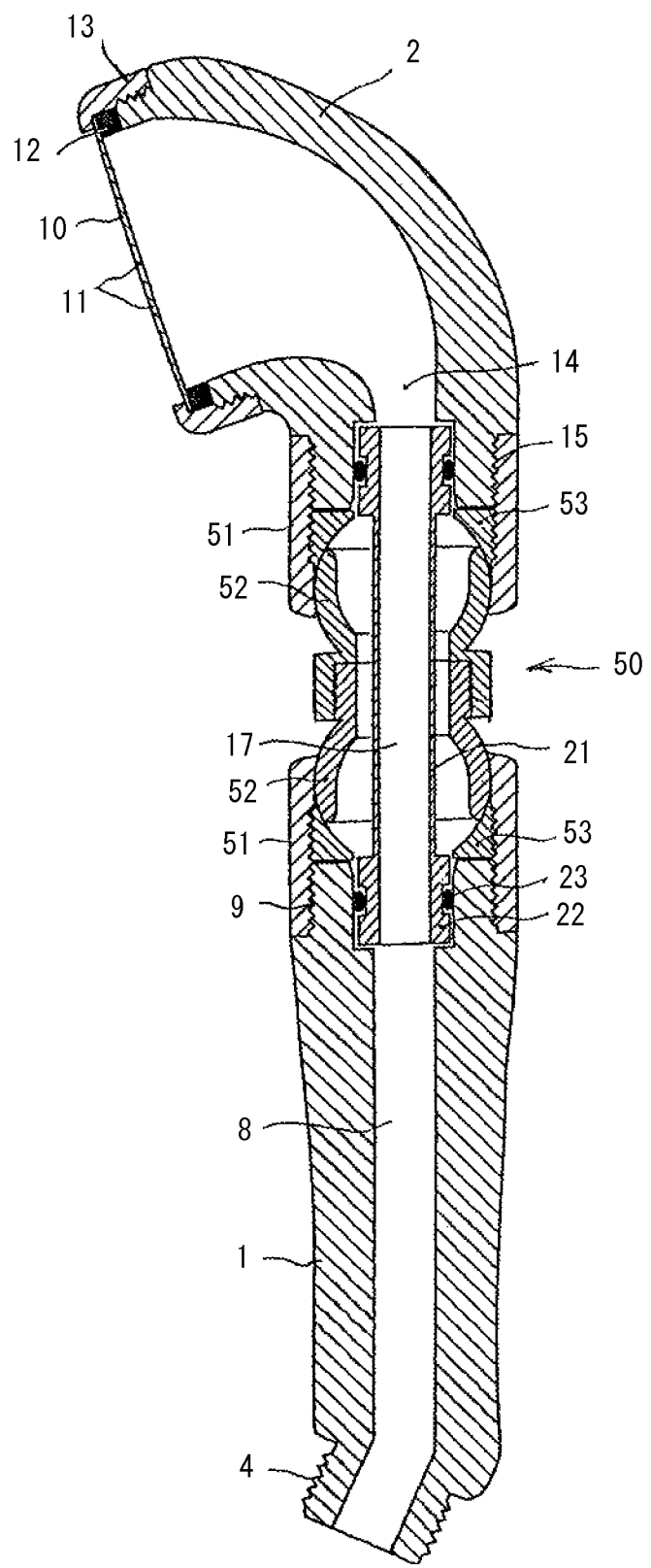
FIG. 9 is a cross-sectional view of a shower head of a fourth embodiment.
Figure 10:
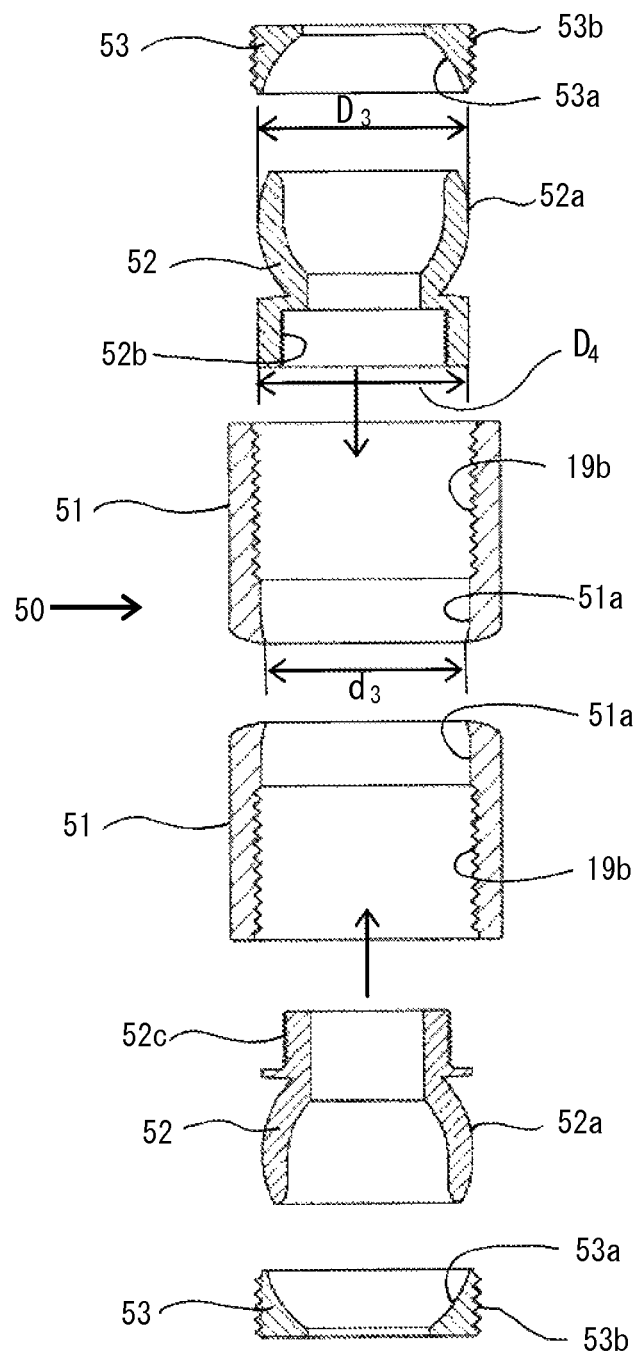
FIG. 10 is an exploded cross-sectional view of a bendable pipe used in the shower head of FIG. 9.

FIG. 9 is a cross-sectional view of a shower head of the fourth embodiment, and FIG. 10 is an exploded cross-sectional view of a bendable pipe used in the shower head.

In the fourth embodiment, a bendable pipe 50 having a structure different from that of the bendable pipe 16 of the first embodiment is used in place of the pipe 16. Since members other than the pipe 50 may be the same as those of the first embodiment, the same reference symbols are attached to the same members, and description thereof will be omitted.

As shown in FIG. 10, the bendable pipe 50 of the embodiment comprises a pair of female pipe members 51, 51, a pair of male pipe members 52, 52, and a pair of adjusting rings 53, 53 as an adjusting means; each of these pipe members is made of a synthetic resin.

Each female pipe member 51, 51 includes a first end having an internal female spherical surface 51a, 51a and a second end having the joining screw thread 19b, 19b.

One of the male pipe members 52, 52 includes a first end having an external male spherical surface 52a and a second end having a joining screw threads 52b, and the other includes a first end having an external male spherical surface 52a and a second end having a joining screw thread 52c; the joining screw threads 52b and 52c are screwable to each other. In detail, the joining female screw thread 52b is formed on an internal surface of the second end, the joining male screw thread 52c is formed on an external surface of the second end, and the joining male screw thread 52c is inserted and screwed into the joining female screw thread 52b. The male spherical surface 52a, 52a has a curvature equal to that of the female spherical surface 51a, 51a of the female pipe member 51, 51 so that the spherical surfaces 51a and 52a are rotationally fitted and slidingly contactable with each other.

An internal diameter d3 of an opening of the female spherical surface 51a side of the female pipe member 51 is smaller than an external diameter D3 of the male spherical surface 52a, 52a of the male pipe member 52, 52 (d3<D3), so that the male spherical surface 52a, 52a does not come out from the opening having the internal diameter d3. However, an external diameter D4 of the joining screw thread 52b, 52c formed at the respective second ends of the male pipe members 52, 52 is smaller than the internal diameter d3 of the opening of the female pipe member 51 (D4<d3).

Each adjusting ring 53, 53 has an internal female spherical surface 53a fittable and rotationally and slidingly contactable with the male spherical surface 52a, 52a of the male pipe member 52, 52, and an external adjusting screw thread 53b, 53b for screwing to the joining screw thread 19b, 19b of the female pipe member. The female spherical surface 53a, 53a has the same curvature as that of the female spherical surface 51a, 51a of the female pipe member 51, 51.

The female pipe members 51, 51, the male pipe members 52, 52 and the adjusting rings 53, 53 are assembled into a pipe as described below.

The joining screw threads 52b, 52c of the male pipe members 52, 52 are made to face the joining screw threads 19b, 19b of the female pipe members 51, 51 respectively, as indicated by the arrows in FIG. 10, the male pipe members 52, 52 are inserted from openings of the joining screw thread 19b sides of the female pipe members 51, 51 respectively, and the joining screw threads 52b, 52c of the male pipe members 52, 52 are projected from the openings, each having the internal diameter d3, of the female pipe members 51, 51. The projected joining screw threads 52b, 52c are screwed to each other so that the pair of male pipe members 52, 52 is integrally joined to each other.

Next, the female spherical surfaces 53a, 53a of the adjusting rings 53, 53 are made to face the joining screw threads 19b, 19b of the female pipe members 51, 51 respectively, as indicated by the arrows in FIG. 10, the adjusting screw threads 53b, 53b of the adjusting rings 53, 53 are screwed to the joining screw threads 19b, 19b of the female pipe members 51, 51, and the female spherical surfaces 53a, 53a of the adjusting rings 53, 53 are brought into contact with the male spherical surfaces 52a, 52a of the male pipe members 52, 52. Thus, the adjusting rings 53, 53 serve as a stopper for preventing the male pipe members 52, 52 from coming out in a direction opposite from a direction of the arrow.

By the above assembling work, the female pipe members 51, 51, the male pipe members 52, 52 and the adjusting rings 53, 53 are assembled into a pipe as a whole. The pipe is a multi-spherical bendable joint pipe, because spherical joints, each in which the male spherical surface 52a, 52a is slidingly contactable with the female spherical surfaces 51a, 51a and 53a, 53a are formed at two positions in the axial direction.

By screwing the joining screw threads 19b, 19b of the female pipe members 51, 51 to the grip-side joining screw thread 9 and the head-side joining screw thread 15 respectively, the bendable pipe 50 is installed between the grip 1 and the head 2 to mechanically join the grip 1 and the head 2 to each other.

The flexible hose 17 as a water passage is disposed in the bendable pipe 50 in the same structure as that shown in FIG. 4.

Operation of the fourth embodiment having such a constitution will be described.

Since the female and male spherical surfaces are rotatable in relation thereto in each spherical joint, in which the surfaces are fitted with each other, constituting the bendable pipe 50 of the embodiment, the bendable pipe 50 can be not only bent as shown in FIGS. 1(B) and (C) but axially rotated as indicated by the arrow of FIG. 1(A). Therefore, the direction of the head 2 can be selected over a wide range.

Additionally, since the spherical joints are provided at two positions, a bending angle adjustment range can be further widened, compared with that of a conventional pipe having a bending point at one position.

When the bendable pipe 50 is bent, the flexible hose 17 disposed in the pipe 50 is bent following bending of the bendable pipe 50 due to the free bending thereof.

Additionally, although a twisting force is applied to the flexible hose 17 when the bendable pipe 50 is rotated, the O-rings 23, 23 at both ends of the flexible hose 17 are rotationally slidingly contactable with the hose insertion ports 8a and 14a to prevent a twisting of the hose. In this case, since the O-rings 23 come into contact with the inside surface of the hose insertion ports 8a and 14a respectively at a small contact area, resistance is small, the hose smoothly rotates in relation to the grip 1 and the head 2, and a twisting of the hose can be prevented. The flexible hose 17 thus bends following bending and rotation of the bendable pipe, so that a water passing route can be ensured.

When the adjusting rings 53, 53 screwed to the female pipe members 51, 51 are further rotated, the female spherical surfaces 53a, 53a of the adjusting rings 53, 53 press the male spherical surfaces 52a, 52a of the male pipe members 52, 52. Thus, frictional forces between the male spherical surface 52a, 52a and the female spherical surface 51a, 51a and between the male spherical surface 52a, 52a and the female spherical surface 53a, 53a can be changed. Accordingly, when the bendable pipe 50 having a large frictional resistance is bent or rotated, the resistance can be reduced by loosening the adjusting rings 53, 53, or when the pipe 50 having small frictional resistance is bent or rotated, the resistance can be increased by tightening the adjusting rings 53, 53. Thus, the intensity of force of bending operation can be adjusted.

In the embodiment, the male pipe members 52, 52, as indicated by the arrows in FIG. 10, are inserted from the joining screw thread 19b sides of the female pipe members 51, 51, the joining screw threads 52b, 52c are screwed to each other, and the adjusting rings 53, 53, as also indicated by the arrows in FIG. 10, are screwed to the female pipe members 51, 51 to press the male pipe members 52, 52. Therefore, compared with the case where the male/female spherical surface is forcibly pushed and fitted into/onto the female/male spherical surface in the first to third embodiments, assembling work is easy and the spherical surfaces can be prevented from coming out from each other.

Fifth Embodiment

Next, a fifth embodiment will be described with reference to FIG. 11.

Figure 11:
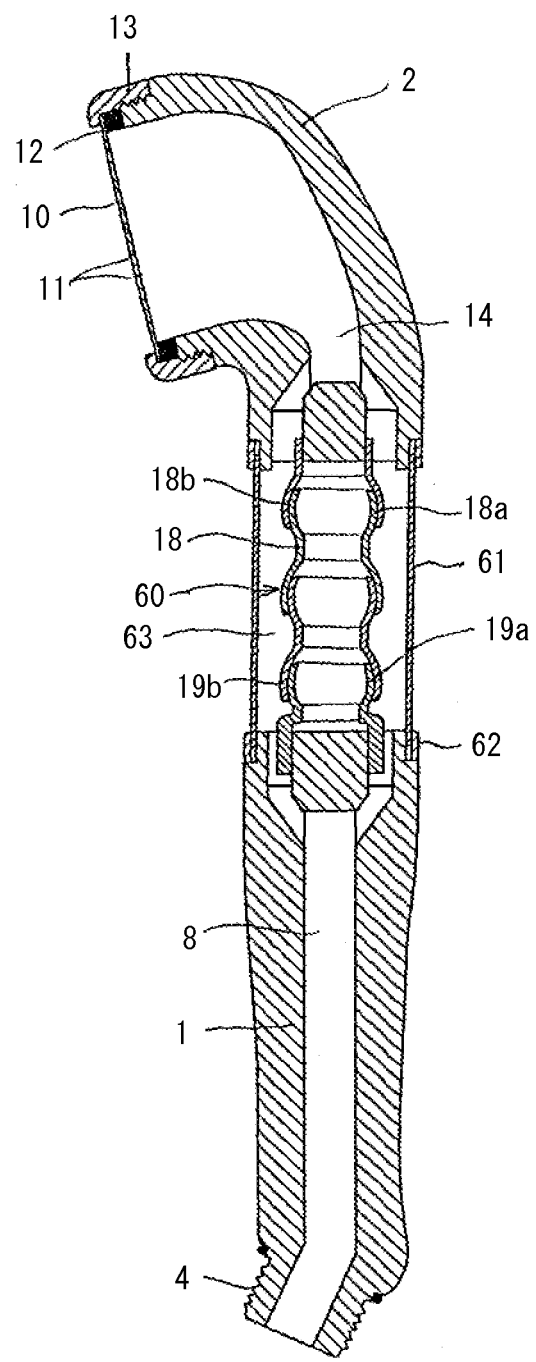
FIG. 11 is a cross-sectional view of a shower head of a fifth embodiment.

FIG. 11 is a cross-sectional view of a shower head of the fifth embodiment.

In the shower head of each of the first to fourth embodiments, the bendable pipe 16, 30, 40 or 50 having the plurality of spherical joints is rotatable by the flexible hose 17, having both ends rotatable in relation to the pipe, arranged on the axis in the pipe. However, the present invention is applicable to a shower head capable of adjusting the jet direction of shower water only by bending of a pipe.

The shower head, which can thus adjust bending, of the fifth embodiment will be described.

A bendable pipe 60 of the embodiment has the same constitution as that of the bendable pipe 16 of the first embodiment, includes spherical joints, in which the female spherical surfaces 18a and 19a and the male spherical surfaces 19b and 18b are joined to each other respectively, at a plurality of positions, is bendable and retains a form after bending.

The bendable pipe 60 is formed thinner than the pipe of the first embodiment, and is installed between the grip 1 and the head 2 on the axis to mechanically join the grip 1 and the head 2 to each other. Moreover, the fitting portion to the bendable pipe 60 in the grip 1 and the fitting portion to the bendable pipe 60 in the head 2 are fixed to the body of the grip 1 and the body of the head 2, respectively (not shown in the cross-sectional view), as far as the bendable pipe 60 has a structure not having a significant influence on a water passage.

A flexible hose 61 is connected between the grip 1 and the head 2 outside the bendable pipe 60 so as to surround the pipe 60. The flexible hose 61 has both ends each having a hose band 62, 62 made of metal or the like, and are watertightly joined to the grip 1 and the head 2 via the hose bands to constitute a water passage 63 therein.

Accordingly, water supplied to the water passage 8 in the grip 1 flows into the head-side water passage 14 through the water passage 63 surrounded by the flexible hose 61.

In the fifth embodiment having such a constitution, since the bendable pipe 60 includes the spherical joints, in which the female spherical surfaces 18a and 19a and the male spherical surfaces 18b and 19b are joined to each other respectively, at a plurality of positions, a bending angle can be largely changed and an adjusting range of the jet direction is widened.

Additionally, since the flexible hose 61 is bent following bending of the bendable pipe 60 although rotation of the head causes a twisting of the hose 61, the bending of the bendable pipe 60 is not obstructed and a water passage extending from the grip to the head can be ensured.

Sixth Embodiment

Next, a sixth embodiment will be described with reference to FIG. 12.

Figure 12:
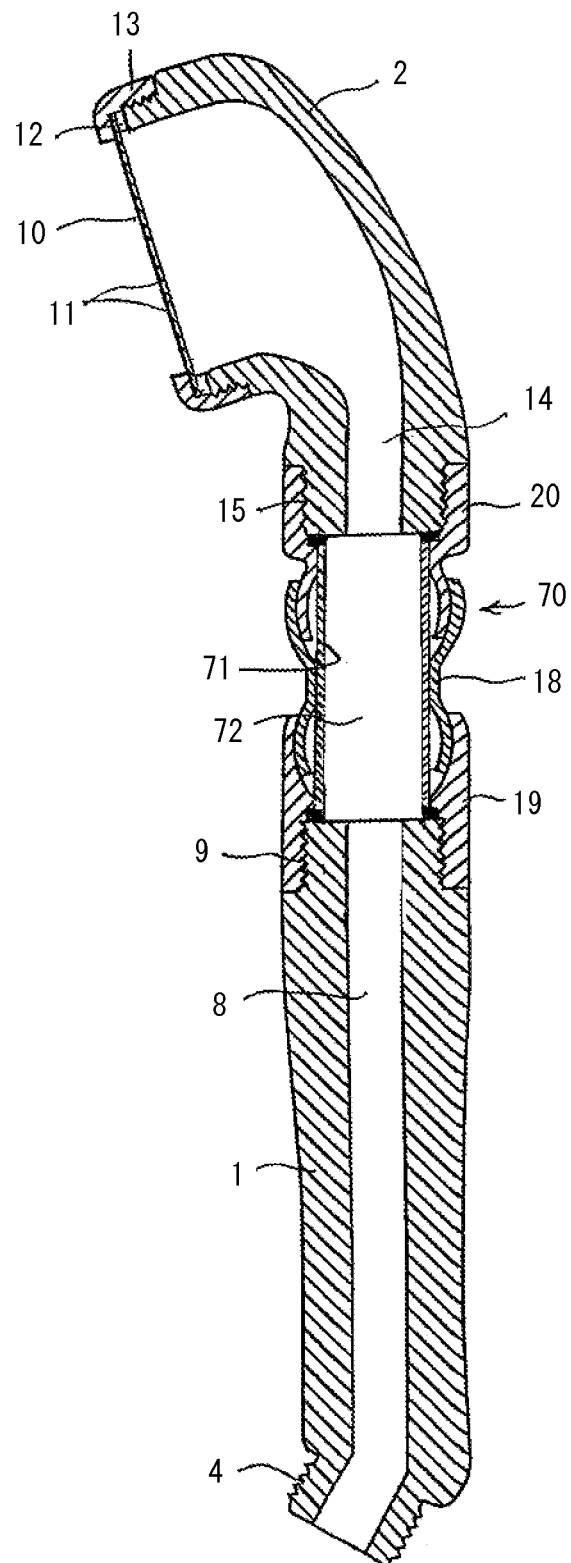
FIG. 12 is a cross-sectional view of a shower head of a sixth embodiment.

FIG. 12 is a cross-sectional view of a shower head of the sixth embodiment.

In the sixth embodiment, a bendable pipe is provided with a watertight structure, a water leakage preventing structure, to serve as a water passage.

A bendable pipe 70 of the sixth embodiment has a combination of the pipe members 18, 19 and 20 similar to the bendable pipe 16 in the first embodiment, is bendable and has a function of retaining a form after bending.

A tube 71 formed of a bendable flexible rubber, bellows or the like is inserted in the bendable pipe 70, both ends of the tube 71 are watertightly joined to the pipe 70 by adhesion, press fitting, pinching or the like, and the tube 71 is integrally attached to the pipe 70.

In this constitution, since the tube 71 is integrated with the bendable pipe 70, handling is easy and assembling work is simplified.

Water supplied from the grip-side water passage 8 flows to the head-side water passage 14 through a water passage 72 formed in the bendable pipe 70, substantially, in the tube 71.

Since the bendable pipe 70 surrounds the tube 71, even if the tube 71 expands by water pressure, the tube 71 comes into contact with an internal surface of the pipe 70 and the expansion is regulated. Thus, even if the tube 71 is thinned, the tube 71 is not broken, does not cause water leakage and fulfills a function of a water passage.

A bendable pipe, which is provided with a watertight structure, a water leakage preventing structure, to serve as a water passage, is not limited to the pipe of the sixth embodiment. If, for example, a heat-shrinkable tube, a rubber tube (not shown) or the like is brought into close contact with an external circumferential surface of each of the bendable pipes 16, 30, 40 and 50 of the first to fourth embodiments, the bendable pipes 16, 30, 40 and 50 can be watertight, a water passage can be formed in each pipe itself even if the flexible hose 17 shown in the FIG. 4 is not especially used.

Additionally, a water passage may be formed in each bendable pipe 16, 30, 40, 50 itself by forming a water-proof film on an internal surface of each pipe.

Seventh Embodiment

Figures 13A, 13B, 13C:
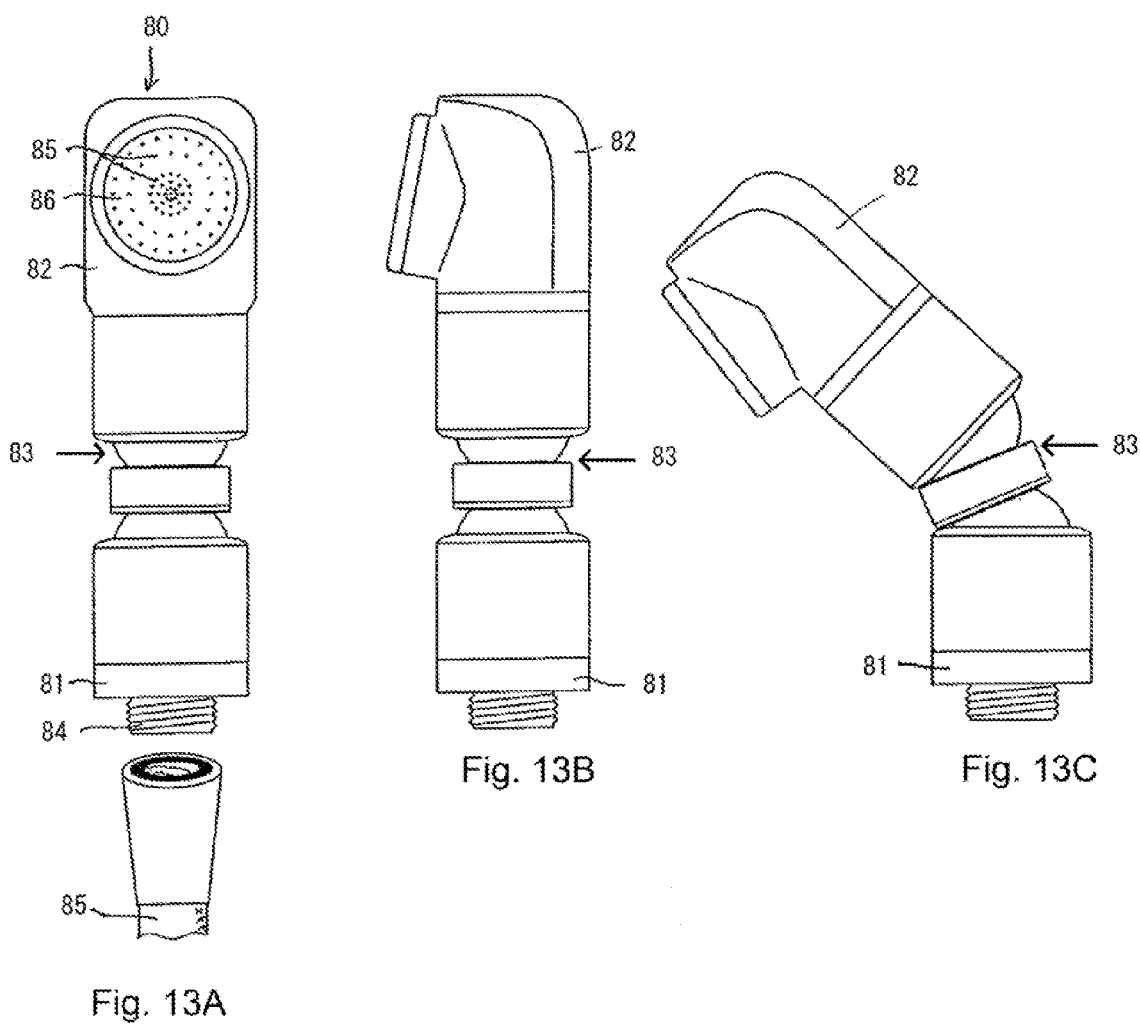
Figure 14:
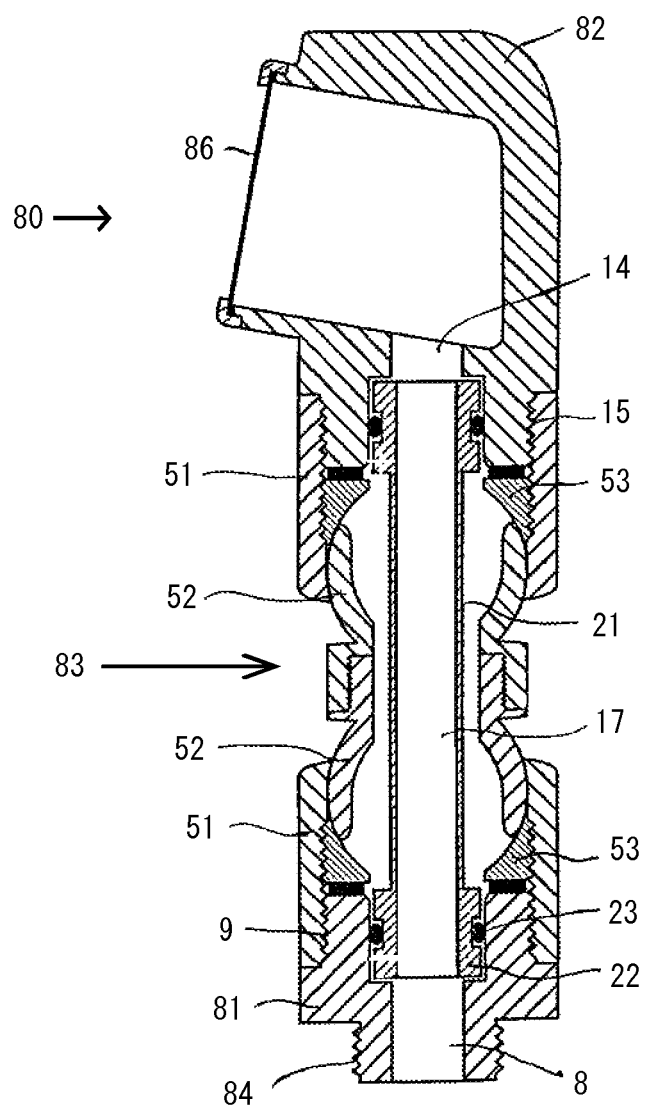
FIG. 14 is a cross-sectional view of the shower head of FIGS. 13A-13C.

Next, a seventh embodiment will be described with reference to FIGS. 13A-13C and 14. The seventh embodiment indicates the case where the invention is applied to a small hand-held shower head used at a shampoo table of a beauty parlor or a barbershop. FIG. 13(A) is a front view of the shower head, FIG. 13(B) is a side view thereof, and FIG. 13(C) is a side view thereof adjusted to a bending state, and FIG. 14 is a cross-sectional view thereof.

The hand-held shower head used in a barbershop or a beauty parlor is small enough for the whole shower head to be held in the palm of a barber's/beautician's hand, and thus the shower head is suitable for washing hair of the back of a head of a customer lying on his/her back.

A shower head 80 of the embodiment is divided into a base end portion 81 and a head 82, and an angle-adjusting means 83 is connected between the base end portion 81 and the head 82.

The base end portion 81 has a coupling screw thread 84, and the coupling screw thread 84 is coupled with a shower hose 85 as a water supply source.

A water-spraying plate 86 having a large number of water-spraying holes 85 is attached to the head 82.

The angle-adjusting means 83 of the embodiment employs the same structure as that of the bendable pipe 50 shown in FIGS. 9 and 10 of the fourth embodiment. Therefore, the same reference numerals are attached to the same members of the embodiment as those used in the fourth embodiment, and description thereof will be omitted.

The flexible hose 17 as the same as shown in FIG. 4 (used also in the fourth embodiment) is installed in the bendable pipe 50.

Although a general shower head for barbershops/beauty parlors is small enough for being inserted between the back of a head of a customer lying on his/her back and a shampoo table to wash the hair of the back of the head of the customer, the shower head of the seventh embodiment having such a constitution is effective for slightly adjusting a direction of the shower head in a the palm of barber's/beautician's hand in washing to change a spot the shower water hits.

The present invention is applicable also to a shower apparatus having a base end portion fixed to a wall of a bathroom or coupled with a water supply pipe.

INDUSTRIAL APPLICABILITY

As described above, according to the present invention, since a direction of a head relative to a base end portion can be changed, a jet direction of shower water can be freely changed. Additionally, since an angle-adjusting means joining the base end portion and the head to each other has a multi-spherical bendable joint structure that a plurality of spherical joints are disposed consecutively, each joint having a male or female spherical surface for rotationally fitting adjacent joints with each other, a bending direction can be changed more than that of a conventional single spherical joint type and usability is improved.

Additionally, according to the present invention, since not only can the bending angle be largely changed, but also the head can be rotated, the jet direction of shower water can be widely adjusted three-dimensionally and usability is improved.

DESCRIPTION OF REFERENCE NUMERALS

1 . . . Grip (Base end portion)
2 . . . Head
3 . . . Angle-adjusting means
16, 30, 40, 50, 60, 70, 83 . . . Bendable pipe
17, 61, 71 . . . Flexible hose
18 . . . Female-male pipe member
18a, 19a, 32a, 41a, 51a . . . Female spherical surface
18b, 20a, 31a, 42a, 52a . . . Male spherical surface
19, 32, 51 . . . Female pipe member 19b, 20b . . . Joining screw thread
20, 42, 52 . . . Male pipe member
21 . . . Rubber hose
22 . . . Connector
31 . . . Male-male pipe member
41 . . . Female-female pipe member
53 . . . Adjusting ring
61 . . . Flexible hose
71 . . . Tube

The invention claimed is:

1. A shower apparatus comprising:
a head having a water-spraying portion,
a base end portion for coupling the head to a water supply source, and
an angle-adjusting device between the head and the base end portion for changing a direction of the water-spraying portion relative to the base end portion to allow for change of a spraying direction of shower water, the angle-adjusting device including a bendable pipe repeatedly bendable and retaining a bent form, the bendable pipe comprising a synthetic resin and being a multi-spherical bendable joint pipe comprising a plurality of spherical joints disposed consecutively, the multi-spherical bendable joint pipe including:
  a pair of female pipe members including a first female pipe member and a second female pipe member, each of the pair of female pipe members having a first end having an internal female spherical surface and a second end having a joining screw thread joining with one of the head or the base end portion,
  a pair of male pipe members including a first male pipe member and a second male pipe member, each of the pair of male pipe members having a first end having an external male spherical surface fitted to and rotationally and slidably contacting the internal female spherical surface of a corresponding one of the female pipe members, and a second end having a joining screw thread, the first male pipe member and the second male pipe member being joined together by the joining of the joining screw threads of the second end of each of the male pipe members;
  a pair of adjusting rings for adjusting a frictional force between the external male spherical surface of each of the pair of male pipe members and the internal female spherical surface of the corresponding one of the pair of female pipe members in the multi-spherical bendable joint pipe, each of the pair of adjusting rings having:
    an internal female spherical surface fitted to and rotationally and slidably contacting the external male spherical surface of the corresponding male pipe member, and
    an external adjusting screw thread screwed to the joining screw thread of the female pipe member, wherein the pair of adjusting rings are configured to adjust a frictional force between the external male spherical surface and the internal female spherical surface by adjusting a screw connection between the external adjusting screw thread of each of the pair of adjusting rings and the joining screw thread of the corresponding female pipe member;
wherein the pair of female pipe members, the pair of male pipe members, and the pair of adjusting rings are configured such that, when each of the adjusting rings screwed to a respective one of the female pipe members is rotated, the female spherical surface of each of the adjusting rings is pressed against the male spherical surface of the corresponding male pipe member;
wherein the pair of female pipe members, the pair of male pipe members, and the pair of adjusting rings of the multi-spherical bendable joint pipe are arranged to form the plurality of spherical joints,
a bendable water passage bendable to follow a bending of the bendable pipe so as to guide water in a direction from the base end portion toward the head, the bendable water passage comprising a flexible hose having a first end joined to the head and a second end joined to the base end portion, and the flexible hose being disposed inside of the bendable pipe, and
a pair of O-rings including a first O-ring between the first end of the flexible hose and the head to provide a seal between the flexible hose and the head while allowing the flexible hose to rotate relative to the head, and a second O-ring between the second end of the flexible hose and the base end portion to provide a seal between the flexible hose and the base end portion while allowing the flexible hose to rotate relative to the base end portion.

* * * * *